(12) United States Patent
Kanaya

(10) Patent No.: US 6,466,375 B1
(45) Date of Patent: Oct. 15, 2002

(54) APPARATUS AND METHOD FOR LIMITING LIGHT DIVERGENCE ANGLE AND PROJECTION IMAGE DISPLAY APPARATUS

(75) Inventor: Midori Kanaya, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/559,105

(22) Filed: Apr. 27, 2000

(30) Foreign Application Priority Data

May 18, 1999 (JP) ............................................. 11-136677

(51) Int. Cl.[7] ...................... G02B 27/14; G02B 27/28; G02B 5/30; H04N 5/225; G06K 9/00
(52) U.S. Cl. ...................... 359/634; 359/494; 359/500; 359/619; 348/335; 382/54
(58) Field of Search ................................. 359/634, 494, 359/500, 619; 348/335, 336; 382/54, 167; 349/66, 106, 61, 5; 355/67

(56) References Cited

U.S. PATENT DOCUMENTS

| | | | | |
|---|---|---|---|---|
| 6,064,452 A | * | 5/2000 | Ogino | ........................ 349/57 |
| 6,185,041 B1 | * | 2/2001 | Tadic-Galeb et al. | ........ 359/618 |
| 6,219,111 B1 | * | 4/2001 | Fukuda et al. | .................. 349/5 |
| 6,104,458 A1 | * | 8/2001 | Fukuda | ......................... 349/95 |
| 6,330,112 B1 | * | 12/2001 | Kaise et al. | ................. 359/621 |
| 2001/0021018 A1 | * | 9/2001 | Basiji et al. | ................. 356/326 |

* cited by examiner

*Primary Examiner*—Georgia Epps
*Assistant Examiner*—Tim Thompson
(74) *Attorney, Agent, or Firm*—Ronald P. Kananen, Esq.; Rader, Fishman, Grauer, PLLC

(57) ABSTRACT

Disclosed is a light divergence angle limiting apparatus for improving color purity and displaying a high-quality image by blocking unnecessary color rays except for a predetermined color ray. A divergence angle of at least one of a plurality of color rays is limited in consideration of light emission characteristics of a light source so that color rays (for example, B and G rays) different from a predetermined color ray (for example, R ray) do not enter a pixel corresponding to the predetermined color ray by using a light blocking plate provided as a light divergence angle limiting apparatus.

44 Claims, 7 Drawing Sheets

APPARATUS AND METHOD FOR LIMITING LIGHT DIVERGENCE ANGLE AND PROJECTION IMAGE DISPLAY APPARATUS

BACKGROUND OF THE INVENTION

1. Field of the Invention

The present invention relates to a light divergence angle limiting apparatus and method for limiting the divergence angle of light entering a plurality of pixels, and a projection image display apparatus having a plurality of pixels which are made to correspond to a plurality of color rays.

2. Description of the Related Art

Conventionally, there is an image display apparatus for displaying an image by using a liquid crystal display device (hereinbelow, referred to as a liquid crystal panel) as an optical modulating device. Image display apparatuses for displaying a color image are broadly divided into two types; a single-panel type using a single liquid crystal panel, and a triple-panel type using three liquid crystal panels corresponding to three color rays of red (R), green (G), and blue (B). In an image display apparatus using the liquid crystal panels, for example, light emitted from a light source is spatially modulated by the liquid crystal panels and the modulated light is projected onto a screen or the like, thereby displaying an image. Image projection types include a front projection type for projecting an image from the front side of a screen or the like and a rear projection type for projecting an image from the rear side of a screen or the like. The types of liquid crystal panels include a transmission type which transmits irradiated light and a reflection type which reflects irradiated light.

Some single panel type image display apparatuses each using the above-mentioned liquid crystal panel have, for example, a structure using color filters (CF) of three colors of R, G, and B. In the structure using the color filters, since a large quantity of light is absorbed by the color filters, it is difficult to increase the brightness and the structure has a disadvantage that cooling has to be performed. For example, Japanese Patent Application Laid-open No. Hei 4-60538 and "Asia Display '95, p887" disclose a single-panel type image display apparatus which is intended for solving the problems and has the structure in which condenser microlenses each disposed so as to face three pixels are arranged, the color rays of R, G and B are allowed to enter each microlens from different directions and condensed, and the outgoing rays from the microlens are allowed to enter pixels corresponding to the three color rays of R, G and B. In the image display apparatus having such a structure, light entering an area between pixels (black matrix area in which a TFT (thin film transistor) as a switching device for driving pixels is formed) can be also effectively utilized. The substantial aperture ratio is therefore increased and the brightness is accordingly increased. Since an image display apparatus of this kind is constructed by using a single liquid crystal panel having a microlens array in place of a color filter, it is also called a single-plate, microlens, and no-color filter type projection liquid crystal display apparatus.

In the single-plate, microlens, and no-color filter type projection liquid crystal display apparatus, generally, a metal halide lamp is often used as a light source for emitting light to a liquid crystal panel.

As described above, in the single-plate, microlens, and no-color filter type projection liquid crystal display apparatus, color rays of R, G and B are allowed to enter each microlens provided so as to correspond to three pixels from different directions, and the color rays condensed by the microlens are allowed to enter the corresponding pixels for R, G and B, thereby displaying a color image. When an incident divergence angle of light irradiating the liquid crystal panel is large, a color ray (for example, B ray) enters not only a B pixel but also a neighboring pixel (in this case, R pixel or G pixel) as what is called "leakage light", so that color mixture occurs. As a result, color purity of a display image is reduced and there is the possibility that the picture quality deteriorates remarkably. Consequently, the incident divergence angle of light entering the liquid crystal panel has to be limited as necessary.

Particularly, the bright line spectrum of the R color ray of a metal halide lamp generally used as a light source for emitting light irradiating the liquid crystal panel is narrower than that of R and B color rays so that the ratio of the G and B color rays entering the R pixel is higher. It causes a problem that the color purity of the R color ray decreases. In this case, the incident divergence angle of each of the G and B color rays entering the R pixel has to be limited. One of methods of limiting the incident divergence angle is a method of limiting only the incident divergence angles of the G and B rays except for the R ray. The conventional projection liquid crystal display apparatus, however, does not have the structure for limiting the incident divergence angle of a specific color ray but has the structure for commonly limiting the incident divergence angles of all of color rays. Consequently, in order to limit the incident divergence angles of the G and B rays, it is necessary to limit the incident divergence angle of the R ray, and it causes a problem such that the quantity of the R ray decreases.

SUMMARY OF THE INVENTION

The present invention has been achieved in view of the above problems and it is a first object to provide a light divergence angle limiting apparatus and method capable of preventing unnecessary color rays except for a predetermined color ray from entering a pixel corresponding to the predetermined color ray.

A second object of the invention is to provide a projection image display apparatus capable of improving color purity and displaying a high-quality image by preventing unnecessary color rays except for a predetermined color ray from entering a pixel corresponding to the predetermined color ray.

A light divergence angle limiting apparatus of the invention comprises divergence angle limiting means into which light including a plurality of color rays comes and which limits a divergence angle of at least one of the plurality of color rays so that color rays different from a predetermined color ray do not enter a pixel corresponding to the predetermined color ray.

A light divergence angle limiting method according to the invention receives light including a plurality of color rays and limits the divergence angle of at least one of the plurality of color rays so that color rays different from a predetermined color ray do not enter a pixel corresponding to the predetermined color ray.

Further, a projection image display apparatus of the invention comprises: a light source which emits light including a plurality of color rays; light divergence angle limiting means to which light including a plurality of color rays emitted from the light source comes and which limits a divergence angle of at least one of the plurality of color rays so that light rays different from a predetermined light ray do not enter a pixel corresponding to the predetermined color ray; an optical modulating device in which a plurality of pixels corresponding to the plurality of color rays are arranged and which selectively modulates color rays entering the plurality of pixels in accordance with an image to be displayed; and projecting means for projecting each of the color rays optically modulated by the optical modulating device.

In the light divergence angle limiting apparatus and method according to the invention, light including a plurality of color rays comes in and the divergence angle of at least one of the plurality of color rays is limited so that color rays different from a predetermined color ray do not enter a pixel corresponding to the predetermined color ray.

In the projection image display apparatus according to the invention, the divergence angle of at least one of the plurality of color rays included in the light emitted from the light source is limited by the light divergence angle limiting means so that color rays different from a predetermined color ray do not enter a pixel corresponding to the predetermined color ray. The color rays entering the plurality of pixels are selectively optically modulated by the optical modulating device in accordance with an image displayed. Each of the color rays optically modulated by the optical modulating device is projected by the projecting means.

Other and further objects, features and advantages of the invention will appear more fully from the following description.

DETAILED DESCRIPTION OF THE PREFERRED EMBODIMENT

Figure 1:
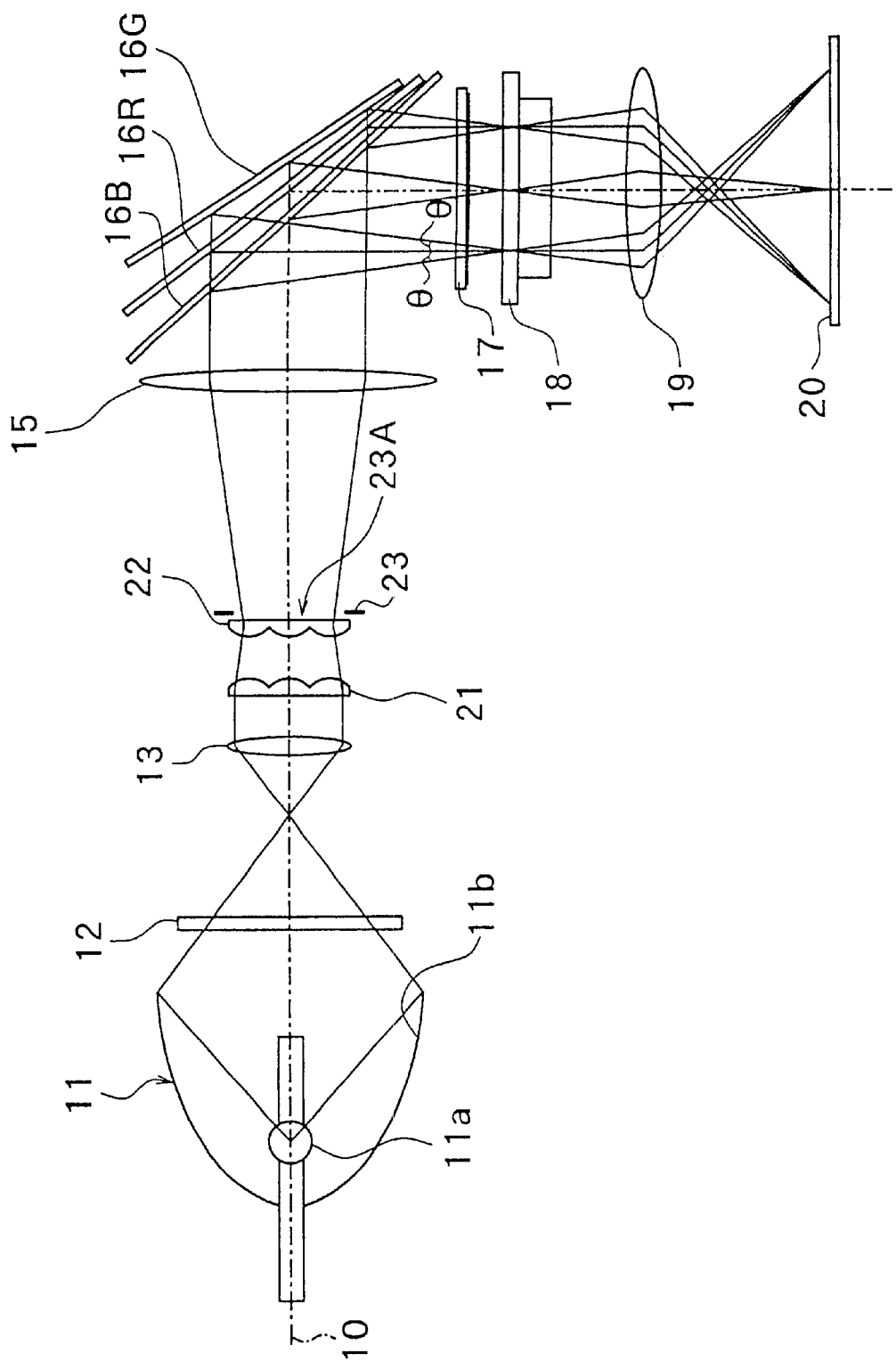
FIG. 1 is a plan view showing a schematic construction of an optical system of a projection image display apparatus according to an embodiment of the invention.

An embodiment of the invention will be described in detail hereinbelow by referring to the drawings.

FIG. 1 shows an example of a schematic construction of an optical system of a projection image display apparatus according to an embodiment of the invention when the apparatus is seen from overhead. In FIG. 1, for simplicity, only paths of main rays of light are shown while the other paths are omitted. With respect to each of optical devices shown in the diagram, the direction orthogonal to the optical axis 10 in the drawing sheet is called the horizontal direction and the direction perpendicular to the sheet is called the vertical direction. The definition will be applied also to the following description.

The projection image display apparatus is constructed as a single-panel type projection liquid crystal display apparatus using no color filter. The apparatus comprises: a light source 11 for emitting white light including a plurality of color rays; a UV/IR cut filter 12 which cuts ultraviolet and infrared rays included in the while light emitted from the light source 11; a collimator lens 13 for transforming light which diverges after passing through the UV/IR cut filter 12 into a nearly parallel luminous flux; a pair of lens arrays 21 and 22 (first lens array 21 and second lens array 22) for diffusing light passed through the collimator lens 13 and uniformalizing the intensity distribution of the light; a light blocking plate 23 which is disposed on the light outgoing side of the second lens array 22 and limits the divergence angle of light outgoing from the second lens array 22; and a collimator lens 15 for transforming a luminous flux passed through the second lens array 22 into an almost parallel luminous flux.

The projection image display apparatus further comprises: dichroic mirrors 16B, 16R and 16G which are sequentially provided on an optical path on the rear side of the collimator lens 15 to separate the white luminous flux going out from the collimator lens 15 into the color rays of B, R and G and reflect the color rays at different angles; an incident-side polarizer 17 for transforming each of the color rays of B, R and G color-separated by the dichroic mirrors 16B, 16R and 16G into linear polarized light in a predetermined polarization direction; a liquid crystal panel 18 for spatially modulating the color rays of three colors of B, R and G linearly polarized by the incident-side polarizer 17 in accordance with an image to be displayed; and a projection lens 19 which projects light passed through the liquid crystal panel 18 onto a screen 20, thereby enlargedly projecting an image to be displayed onto the screen 20. The liquid crystal panel 18 corresponds to a specific example of "optical modulating device" in the invention. The projection lens 19 corresponds to a specific example of "projecting means" in the invention.

Although not shown, a phase plate is provided on the light incident side of the incident-side polarizer 17. The phase plate shifts a predetermined polarized component (for example, p-polarized component) of light reflected by the dichroic mirrors 16B, 16R and 16G by, for example, 45° so as to be adjusted to the polarization axis of the incident-side polarizer 17. The incident-side polarizer 17 transmits only the predetermined polarized component phase-shifted by the phase plate and blocks the other polarized components (for example, s-polarized component). Consequently, light of the predetermined polarized component enters the liquid crystal panel 18. Although not shown, an outgoing-side polarizer is disposed on the rear side of the liquid crystal panel 18. The outgoing-side polarizer transmits only light polarized in a predetermined direction among the light spatially modulated by the liquid crystal panel 18.

The light source 11 includes an emitter 11a and a concave mirror 11b having rotation symmetry. For example, a metal halide lamp is used as the emitter 11a. A mirror with the shape that maximally condenses light is preferred as the concave mirror 11b. For example, a spheroidal mirror is used. When the concave mirror 11b has a spheroid, light emitted from the light source 11 passes through the UV/IR cut filter 12 and is condensed to a second focal point of an ellipsoid specified by the spheroid. The collimator lens 13 transforms light emitted from the light source 11 into an almost parallel luminous flux and leads the parallel luminous flux to the first lens array 21.

The liquid crystal panel 18 is a transmission type liquid crystal display device which uses microlenses but no color filter. The liquid crystal panel 18 selectively modulates the incident color rays in accordance with image signals. Although not shown in FIG. 1, the liquid crystal panel 18 comprises a pixel substrate on which pixel electrodes are regularly two-dimensionally arranged, a counter substrate disposed so as to face the pixel substrate, and a liquid crystal layer disposed so as to fill the gap between the pixel substrate and the counter substrate. The detailed construction of the liquid crystal panel 18 will be described hereinlater by referring to the drawings.

The dichroic mirrors 16B, 16R and 16G are arranged at angles slightly different from each other. The dichroic mirrors 16B, 16R and 16G have the function of selectively reflecting the luminous flux which is almost parallel to the optical axis 10 and is emitted from the collimator lens 15 at an angle of approximately 90 degrees, separating the luminous flux into three color rays of B, R and G, and allowing the color rays to enter the liquid crystal panel 18 at different angles. In the example of FIG. 1, the dichroic mirrors 16B, 16R and 16G are arranged so that the R ray perpendicularly enters the liquid crystal panel 18 and the B and G rays enter the liquid crystal panel 18 at angles of [+θ] and [−θ] from the R ray, respectively. The dichroic mirrors 16B, 16R and 16G can be also arranged in such a manner that the light perpendicularly entering the liquid crystal panel 18 is the B ray (or G ray) and the rays entering at the angles of [+θ] and [−θ], respectively, from the perpendicular direction are the R and G rays (or R and B rays).

The first lens array 21 is constructed by arranging a plurality of lens elements on a plane, divides an almost parallel single luminous flux from the collimator lens 13 into a plurality of luminous fluxes by the lens elements, and condenses the light. One of the faces of each of the lens elements of the first lens array 21 is flat and the other face is a convex face having a predetermined curvature. Each of the lens elements has a shape similar to the shape of the effective area of the liquid crystal panel 18. Each of the lens elements of the first lens array 21 is eccentric so as to condense incident light to each of the lens elements of the second lens array 22 in a one-to-one corresponding manner. The optical axis 10 passes the center of the first lens array 21 and the lens elements are disposed in positions so that an image and the effective area of the liquid crystal panel 18 are conjugate or almost conjugate.

The second lens array 22 has a plurality of lens elements arranged on a plane in correspondence with the lens elements of the first lens array 21. The lens elements of the second lens array 22 pass the small luminous fluxes from the corresponding lens elements of the first lens array 21 so as to be overlapped with each other. The optical axis 10 passes the center of the second lens array 22 and the second lens array 22 is disposed in a position so that the whole second lens array 22 and the pixel aperture of the liquid crystal panel 18 are conjugate or almost conjugate. The whole shape of the second lens array 22 is similar to the aperture shape of the pixels (pixel electrodes 81B, 81R and 81G in FIG. 2 which will be described hereinlater) of the liquid crystal panel 18. Since the second lens array 22 also plays the role of a field lens, it is made eccentric as necessary. The field lens denotes, for example, the lens elements of the second lens array 22 disposed in positions so that, when the focal distance of each of the lens elements of the first lens array 21 is f1 and the focal distance of each of the lens elements of the second lens array 22 is f2 (=f1), a synthetic focal distance f of the lens elements is f1.

The light blocking plate 23 has an optically transparent aperture 23A in its center and blocks light incident on itself except the aperture 23A. As will be described hereinlater by referring to the drawings, the light blocking plate 23 is provided with a filter 30 (FIG. 3B) or filters 30B and 30G (FIG. 3C) so as to partially cover the aperture 23A. The filter blocks only a specific color ray (for example, the B and G color rays) among incident light, whose divergence angle has to be limited. The light blocking plate 23 and the filter 30 (or filters 30B and 30G) correspond to a specific example of "divergence angle limiting means" in the invention. The light blocking plate 23 corresponds to a specific example of "light blocking means" in the invention.

As each of the filters 30, 30B and 30G, for example, what is called an absorption filter or an interference filter is used. The absorption filter absorbs light in a specific wavelength range by mixing a coloring agent into a transparent substrate such as glass. The interference filter uses interference of light which occurs since a film is thin, and transmits or reflects light in a specific wavelength range. The interference filter has a construction such that a dielectric is deposited on a transparent substrate made of glass or the like and a thin film layer made of the dielectric is formed. The action on each of the color rays, of the filters 30, 30B and 30G will be described hereinlater by referring to the drawings.

Figure 2:
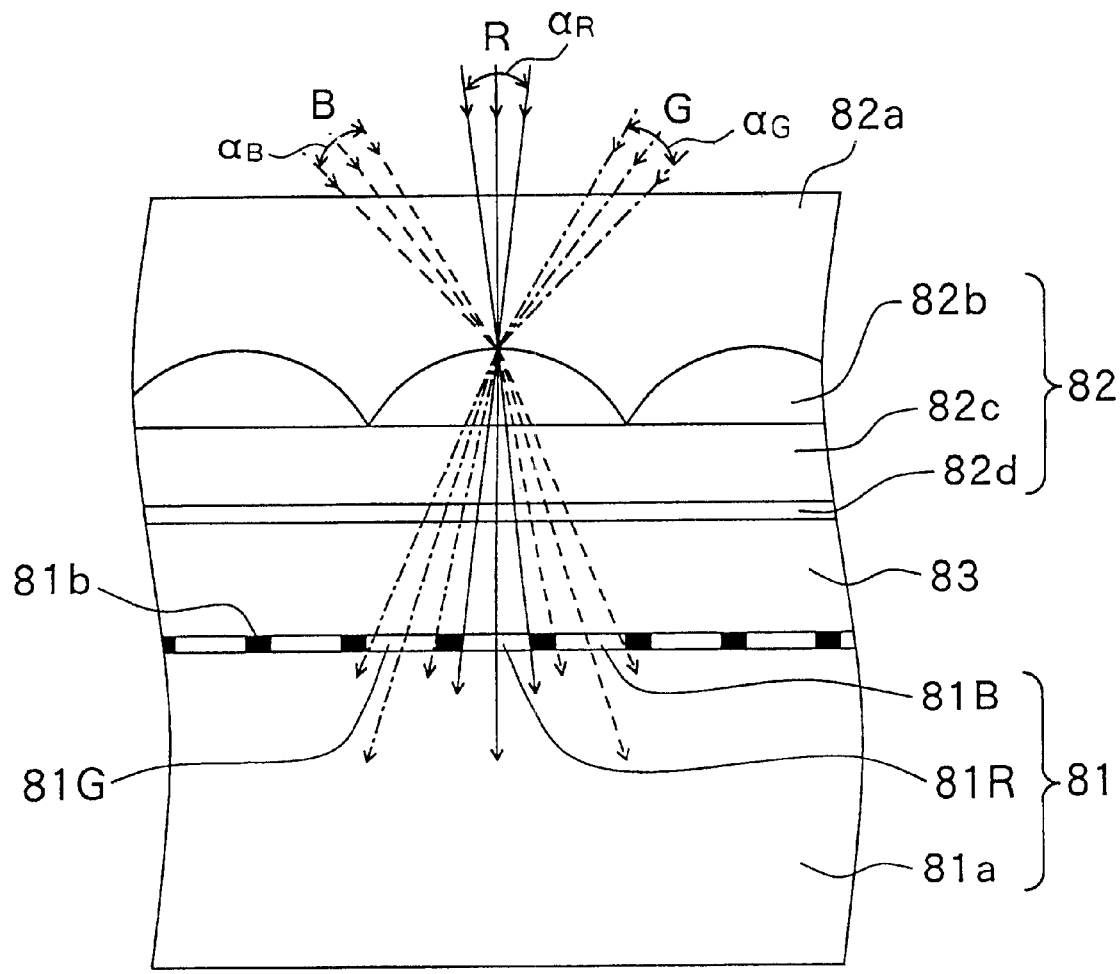
FIG. 2 is a cross section showing the construction of the main part of a liquid crystal panel in the projection image display apparatus shown in FIG. 1.

FIG. 2 enlargedly shows the structure in cross section in the horizontal direction of the liquid crystal panel 18 in FIG. 1. As shown in the drawing, the liquid crystal panel 18 comprises a pixel substrate 81 in which a number of pixel electrodes are formed, a counter substrate 82 in which a counter electrode and microlenses are formed, and a liquid crystal layer 83 sandwiched by the pixel substrate 81 and the counter substrate 82.

The pixel substrate 81 has a glass substrate 81a, pixel electrodes 81B, 81R and 81G for B ray, R ray and G ray which are regularly (periodically) arranged on one side (light incident side) of the glass substrate 81a, and a black matrix 81b comprising TFTs (not shown) which function as a switching device for applying a voltage according to an image signal to each of the pixel electrodes or the like. The TFT has, for example, a gate electrode, a drain electrode, and a source electrode made of, for example, polysilicon (not shown). The gate electrode is connected to an address line (not shown) which extends laterally on the drawing sheet, the source electrode is connected to data lines for B, R and G (not shown) which extend perpendicular to the drawing sheet, and the drain electrode is connected to the pixel electrode 81B, 81R or 81G. When an image signal voltage of B, R or G is selectively applied to the pixel electrode selected by the address line and the data line, alignment of the liquid crystal molecules in the liquid crystal layer 83 between the pixel electrode and the counter electrode 82d changes, so that the polarization direction of light passing the area is changed. The black matrix 81b is shielded from light by a not-shown metal film made of aluminum or the like to prevent erroneous operation of the TFT caused by light irradiation.

The counter substrate 82 has a glass substrate 82a, a microlens array constructed by condenser microlenses 82b formed on one side (light outgoing side) of the glass substrate 82a, a cover glass 82c closely attached to the microlenses 82b, and a counter electrode 82d formed on the cover glass 82c. The counter electrode 82d is a transparent electrode formed on the whole face or a necessary area (that is, at least areas facing the pixel electrodes 81B, 81R and 81G of the pixel substrate 81) of the cover glass 82c and is held at a predetermined potential. The microlens 82b is, for example, formed as a refractive index distributed type lens by etching a substrate in a lens shape and filling the etched part with a transparent resin or by selective ion diffusion. It can be also formed by other arbitrary methods. The microlens 82b is usually formed as a semicylindrical-shaped lens having an axis perpendicular to the drawing sheet face. The microlens 82b can be also a lens having a general spherical shape or a curved shape similar to the spherical shape.

Each of the microlenses 82b is disposed for three pixel electrodes 81B, 81R and 81G of the pixel substrate 81 and condenses the luminous fluxes of B, R and G entering at incident divergence angles αB, αR and αG from different three directions so that the luminous fluxes enter the pixel electrodes 81B, 81R and 81G, respectively, through the liquid crystal layer 83. Attention is paid to the R ray which comes perpendicularly. It is usually set so that the microlens 82b brings the R ray into focus on or near the pixel electrode 81R. As necessary, it can be also set so that the R ray comes into a focus deep inside the glass substrate 81a. Ditto for the other rays (B ray and G ray).

The incident divergence angles $\alpha_B$, $\alpha_R$ and $\alpha_G$ of the color rays of B, R and G entering the microlens 82b are limited so as to be predetermined divergence angles by the light blocking plate 23 (FIG. 1).

The operation and action of the projection image display apparatus having the above-described construction will now be described. The following includes the description of a light divergence angle limiting method in the embodiment.

Referring to the optical system in FIG. 1, the operation of the whole projection image display apparatus will be described first. As shown in FIG. 1, ultraviolet and infrared rays of white light emitted from the light source 11 are cut by the UV/IR cut filter 12. The light is converged once, then diverges, and enters the collimator lens 13. The collimator lens 13 transforms the incident light into a luminous flux which is almost parallel to the optical axis 10. The luminous flux enters the first lens array 21 and is divided into a plurality of small luminous fluxes by the lens elements of the first lens array 21.

Each of the small luminous fluxes divided by the lens elements of the first lens array 21 is converged to an almost center of the corresponding lens element in the second lens array 22, then diffuses while slightly changing the travel direction, and enters the collimator lens 15. The collimator lens 15 transforms the incident luminous flux from the second lens array 21 into an almost tele-centric luminous flux. The angle of each of the color rays going out from the second lens array 22 is limited by the light blocking plate 23 so as to become a predetermined divergence angle.

The luminous flux which has been made almost tele-centric by the collimator lens 15 enters the dichroic mirrors 16B, 16R and 16G. The dichroic mirrors 16B, 16R and 16G separate the incident luminous flux into three color rays of B, R and G and reflect the color rays at different angles. The color ray which has been color-separated and reflected by the dichroic mirrors 16B, 16R and 16G enters the incident-side polarizer 17. The incident-side polarizer 17 transmits only a linear polarized component in a predetermined polarizing direction of the incident color ray. The color rays which have passed through the incident-side polarizer 17 and have been perfectly linearly polarized enter each of the microlenses 82b of the liquid crystal panel 18 from different directions. The liquid crystal panel 18 modulates the intensity of each of the color rays B, R and G in accordance with a color image signal and the resultant rays go out.

The color rays of B, R and G passed through the liquid crystal panel 18 selectively travels through the outgoing side polarizer (not shown), are projected by the projection lens 19 onto the screen 20, and are subjected to color composition.

In such a manner, a color image is projected and displayed on the screen 20.

The action of the filter 30 will be described in more details by referring to FIGS. 3 to 7.

Figure 4:
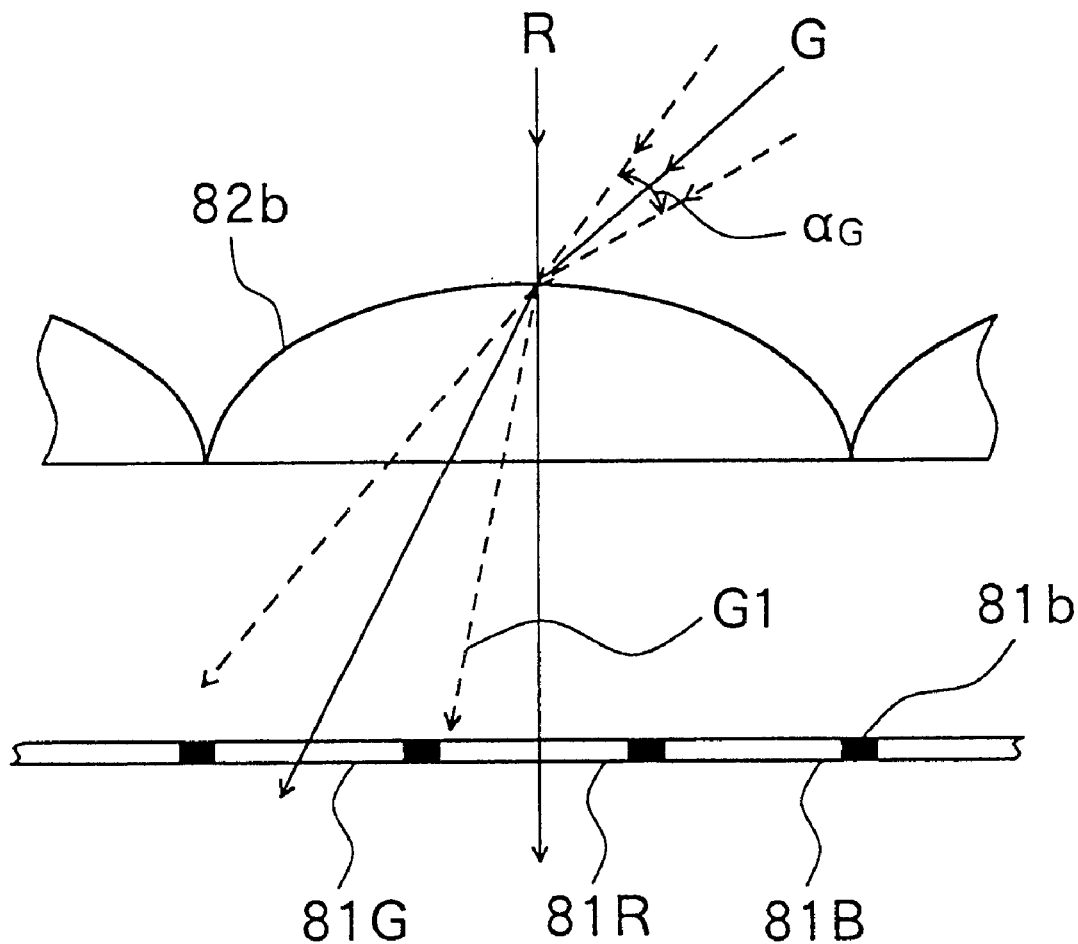
FIG. 4 is a diagram for explaining leakage light entering the liquid crystal panel shown in FIG. 2.

Referring to FIG. 4, what is called "leakage light" which occurs at the liquid crystal panel 18 will be described. As mentioned above, in the projection image display apparatus of the embodiment, the color rays of B, R and G enter the liquid crystal panel 18 from different directions by the action of the dichroic mirrors 16B, 16R and 16G. In the liquid crystal panel 18, the color rays of B, R and G entered from different directions are condensed by the microlens 82b and enter the pixel electrodes 81B, 81R and 81G corresponding to the respective color rays. The color rays of B, R and G entering the microlens 82b have the incident divergence angles $\alpha_B$, $\alpha_R$ and $\alpha_G$, respectively. When the incident divergence angles $\alpha_B$, $\alpha_R$ and $\alpha_G$ are large more than necessary, a color ray (for example, B ray) enters not only the B pixel but also a neighboring pixel (for example, R pixel or G pixel) as leakage light. FIG. 4 shows a case that, due to the incident divergence angle a G of the G ray to enter the G pixel (pixel electrode 81G) which is larger than required, leakage light G1 enters the neighboring R pixel (pixel electrode 81R). When such leakage light occurs, the color purity of a displayed image decreases and there is the possibility that the picture quality severely deteriorates.

In the optical system shown in FIG. 1, the magnitude of each of the incident divergence angles $\alpha_B$, $\alpha_R$ and $\alpha_G$ of light entering the microlens 82b is specified according to the aperture 23A of the light blocking plate 23 disposed on the light outgoing side of the second lens array 22.

Figure 3A:
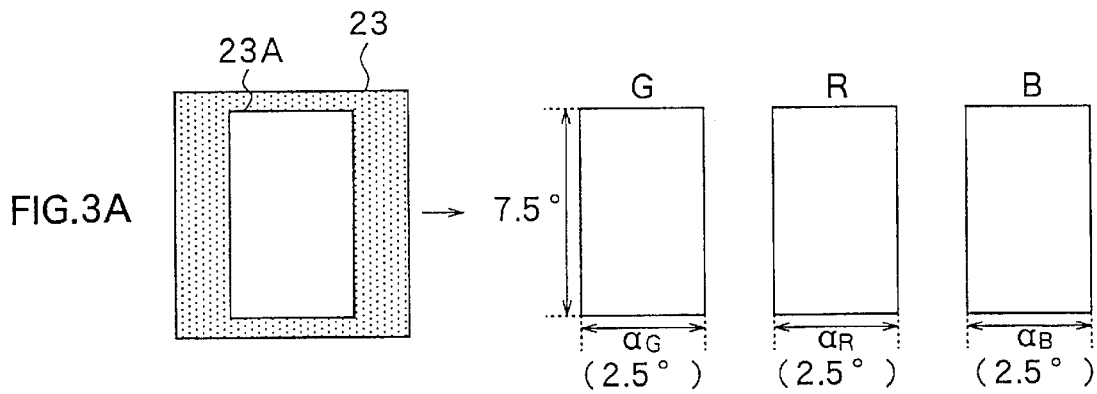
FIGS. 3A to 3C are diagrams for explaining the construction and action of a light blocking plate in the projection image display apparatus shown in FIG. 1.
Figure 3B:
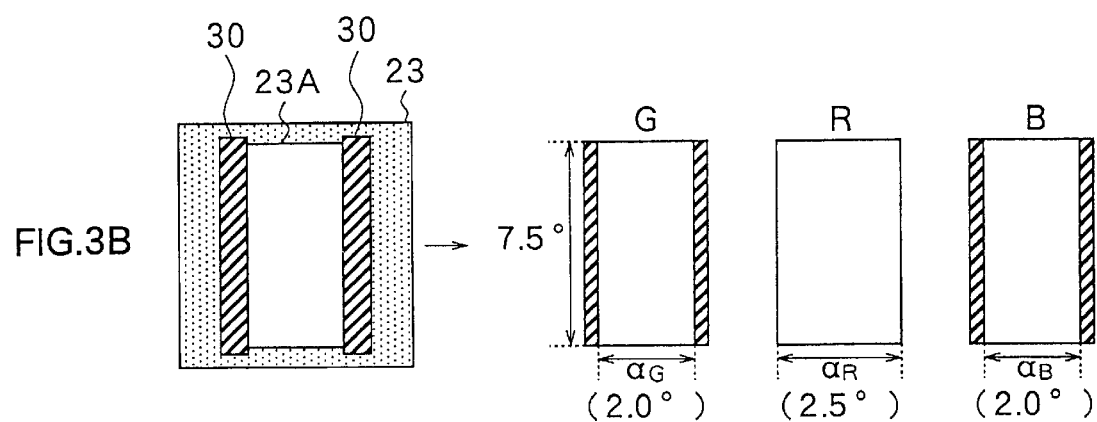
Figure 3C:
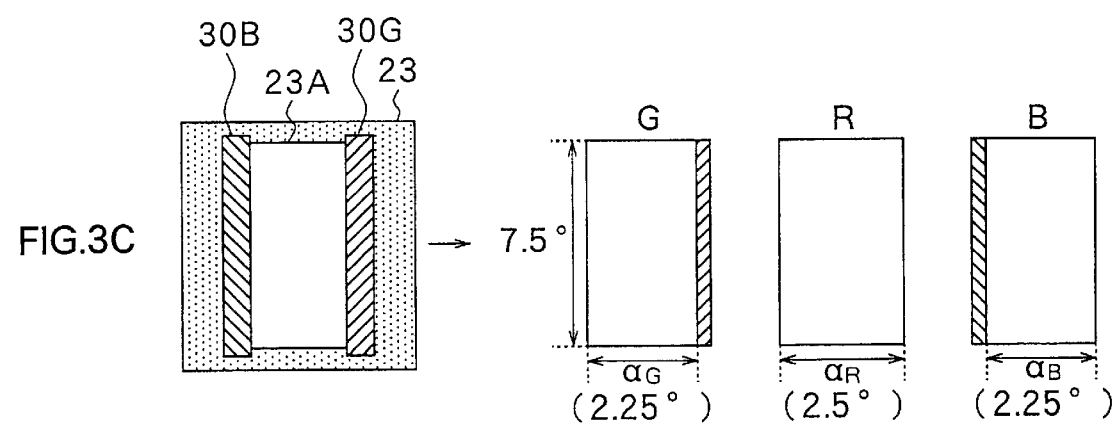

FIGS. 3A to 3C show the action and construction of the light blocking plate 23. In each of the diagrams, the construction of the light blocking plate 23 is shown on the left side and the divergence angles $\alpha_B$, $\alpha_R$ and $\alpha_G$ of the color rays B, R and G specified according to the aperture 23A of the light blocking plate 23 are shown on the right side. The divergence angles $\alpha_B$, $\alpha_R$ and $\alpha_G$ shown in the diagrams are in the horizontal direction. FIG. 3A shows a conventional construction of the light blocking plate 23. In this case, the divergence angles $\alpha_B$, $\alpha_R$ and $\alpha_G$ in the horizontal direction of the color rays are specified according to the size of the aperture 23A and are set to the same angle (for example, 2.5°). The divergence angles in the vertical direction of the color rays are also specified according to the size of the aperture 23A and are set to the same angle (for example, 7.5°).

When the light blocking plate 23 has the construction as shown in FIG. 3A, in order to prevent the leakage light, it is sufficient to reduce the size of the aperture 23A to limit the incident divergence angles $\alpha_B$, $\alpha_R$ and $\alpha_G$. For example, when a metal halide lamp is used as the light source 11, the bright line spectrum of the R ray is narrower as compared with that of the G and B rays. In practice, the G and B rays entering the R pixel become a problem as leakage light. In the case of using the metal halide lamp as the light source 11, it is therefore desirable to limit only the incident divergence angles $\alpha_G$ and $\alpha_R$ of the G and B rays. In the case where the light blocking plate 23 has the construction as shown in FIG. 3A, however, the incident divergence angles $\alpha_B$, $\alpha_R$ and $\alpha_G$ of all the color rays B, R and G are limited. Consequently, the light quantity of the R ray, which is originally small, further decreases. Even if the leakage light is limited, it does not have a direct connection to the improvement in color purity. In the embodiment, therefore, the incident divergence angle of a color ray (R ray in this case) having a small quantity of light is not limited. The incident divergence angles of only the other color rays are limited.

Figure 5:
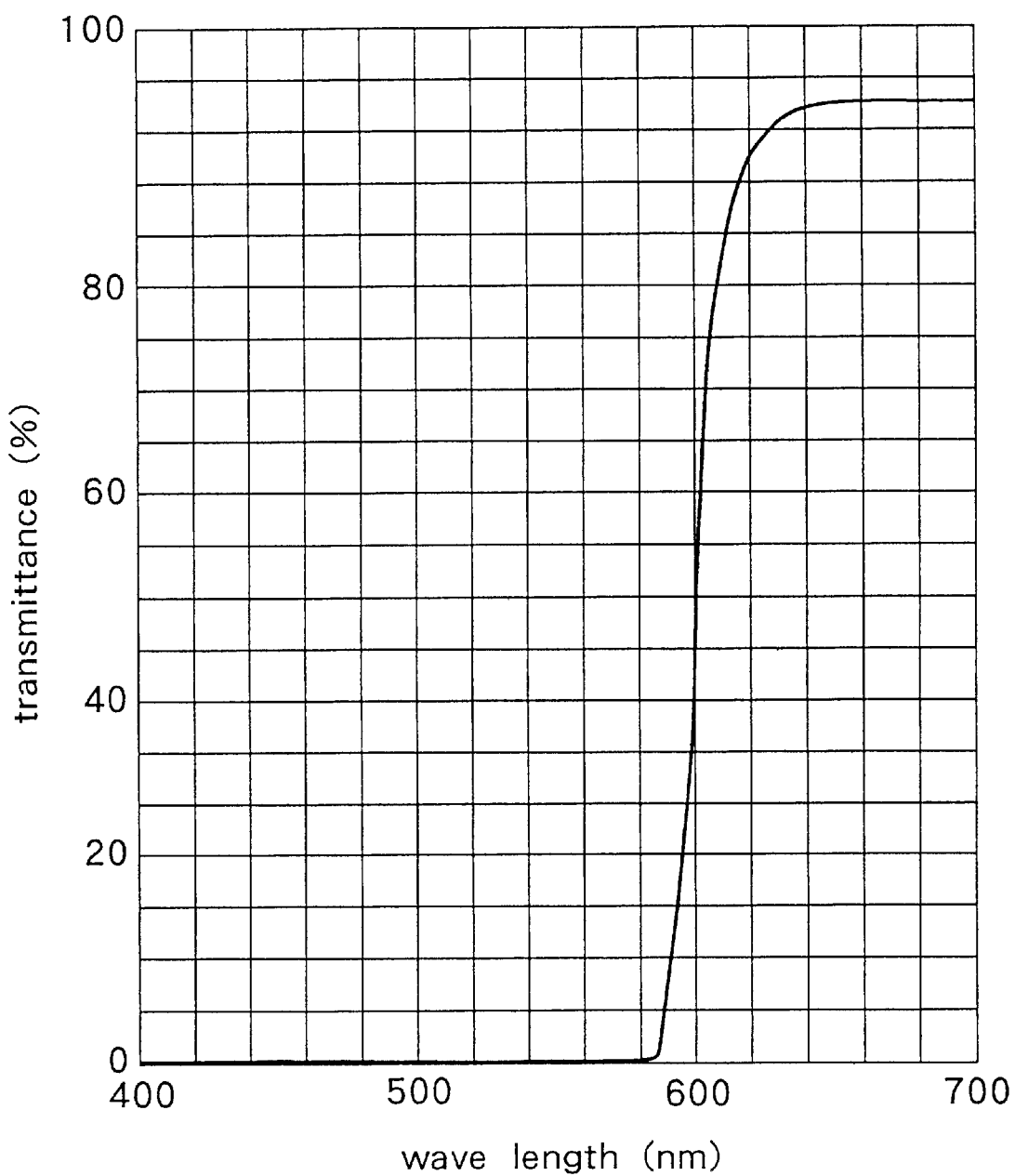
FIG. 5 is a characteristics diagram showing an example of optical characteristics of a filter shown in FIG. 3B.

FIG. 3B shows an example in which the light blocking plate 23 is provided with the filters 30 having an optical action of blocking the color rays (B and G rays) other than the R ray. An example of the optical characteristics of the filter 30 is shown in FIG. 5. In FIG. 5, the lateral axis denotes the wavelength (nm) and the vertical axis denotes transmittance (%) of light. The filters 30 are provided at both ends of the aperture 23A of the light blocking plate 23 so as to partially cover the aperture 23A. The ratio of covering the aperture 23A corresponds to the magnitude of the incident divergence angle to be limited. By providing the filters 30, the incident divergence angles $\alpha_B$ and $\alpha_G$ of the other color rays are limited without limiting the incident divergence angle $\alpha_R$ of the R ray having a small quantity of light. Thus, the leakage light can be effectively prevented so as to improve the color purity. In the example of the diagram, the incident divergence angles $\alpha_B$ and $\alpha_G$ of the B and G rays are limited to 2.0° in contrast to 2.5° for the incident divergence angle $\alpha_R$ of the R ray.

Figure 6:
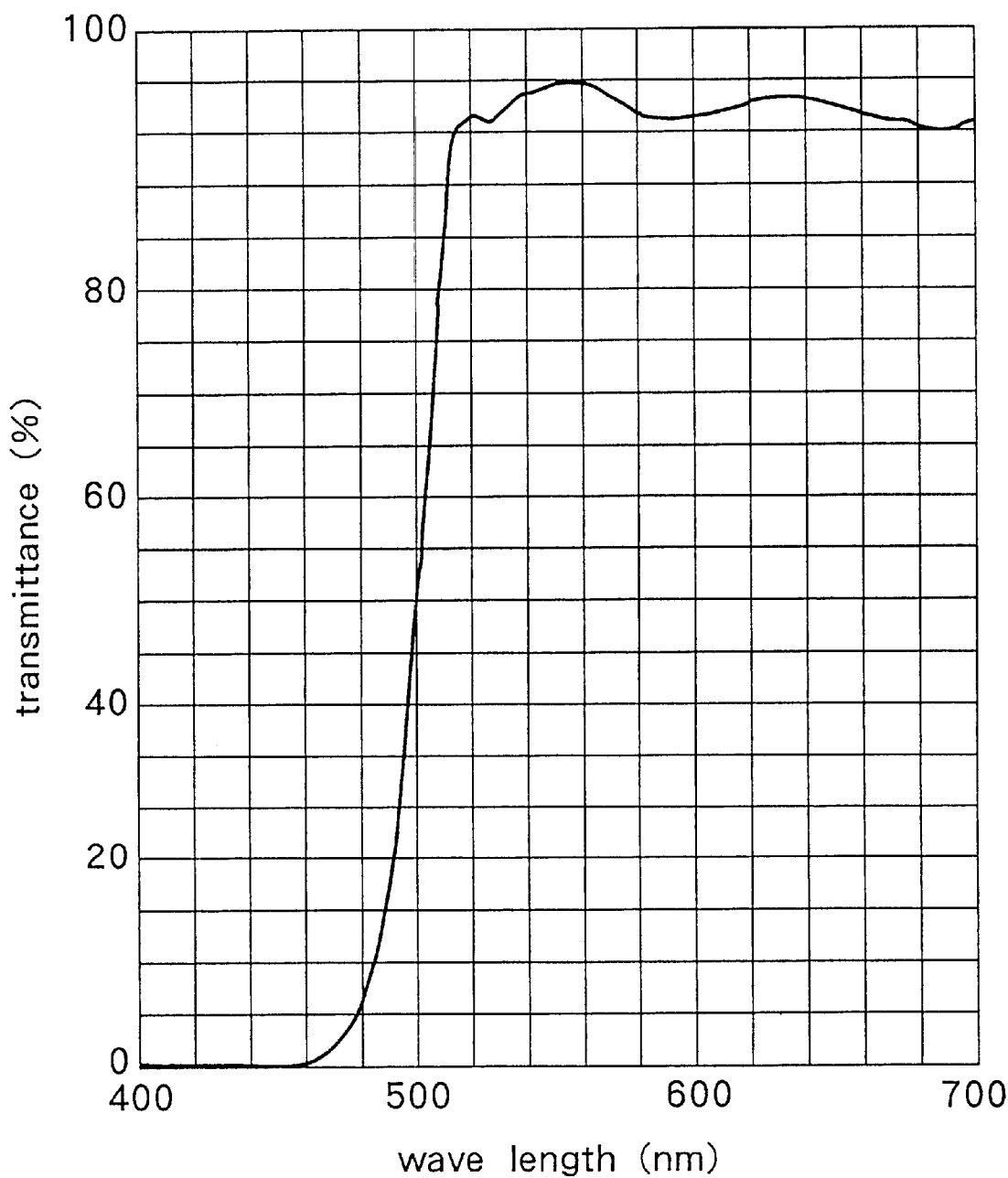
FIG. 6 is a characteristics diagram showing an example of optical characteristics of one of two filters shown in FIG. 3C.
Figure 7:
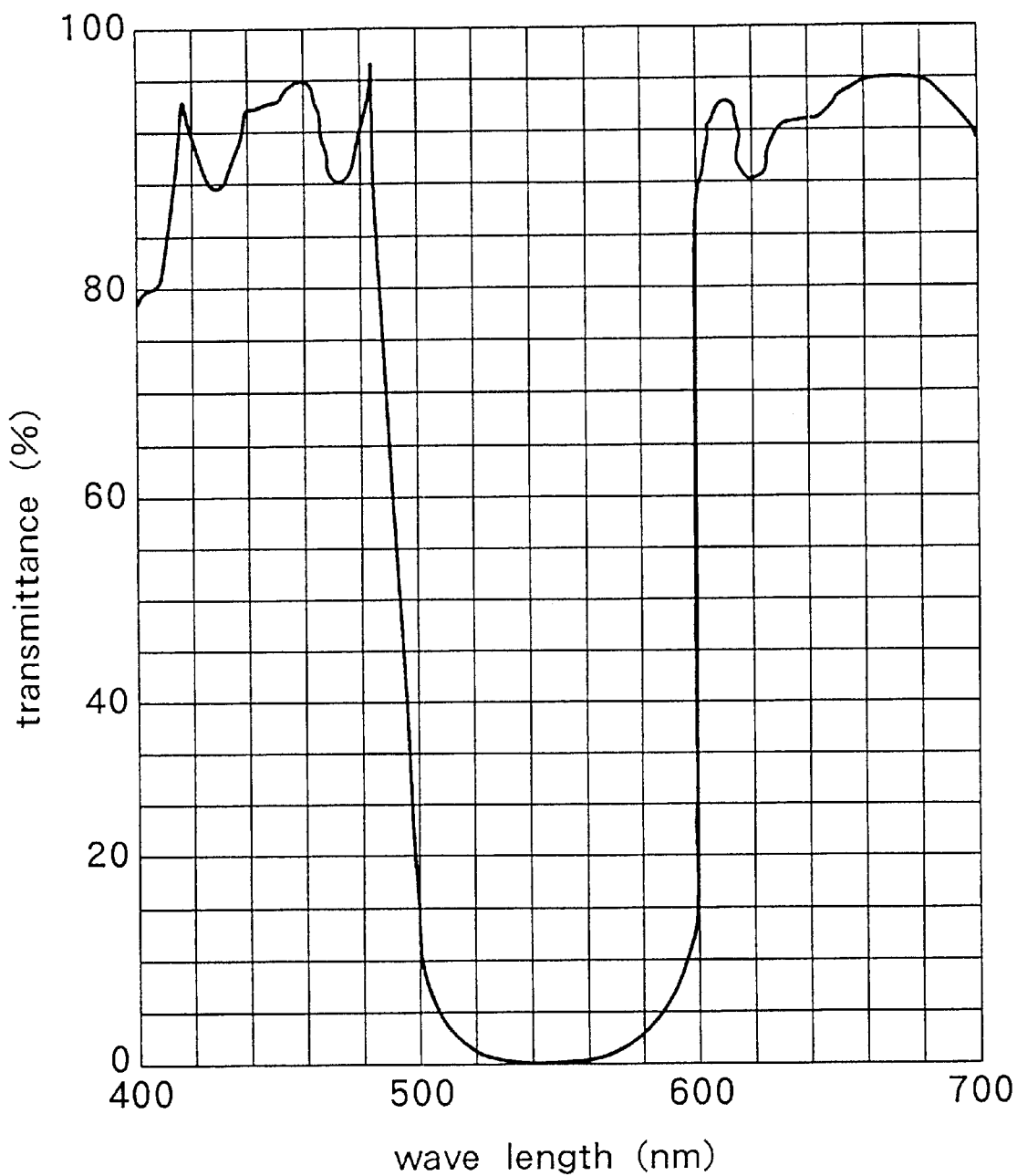
FIG. 7 is a characteristics diagram showing an example of optical characteristics of the other filter of the two filters shown in FIG. 3C.

FIG. 3C shows another example of the construction of the light blocking plate 23. In the example of FIG. 3B, although the incident divergence angles $\alpha_B$ and $\alpha_G$ of the B and G rays are limited not only on the R pixel side but also on the other neighboring pixel side, the incident divergence angle to be inherently limited is only the R pixel side. In the example of FIG. 3C, the light blocking plate 23 is provided with the filter 30B having an optical action of transmitting the R and G rays and cutting the B ray and the filter 30G for transmitting the R and B rays and cutting the G ray to thereby limit only the divergence angle of the color ray entering the R pixel side. An example of the optical characteristics of the filter 30B is shown in FIG. 6 and an example of the optical characteristics of the filter 30G is shown in FIG. 7. In FIGS. 6 and 7, the lateral axis denotes the wavelength (nm) and the vertical axis denotes the transmittance (%) of light.

The filter 30B is provided so as to cover the left end of the aperture 23A of the light blocking plate 23 in correspondence with the arrangement of the B pixel on which the B ray to be blocked is incident. On the other hand, the filter 30G is provided so as to cover the right end of the aperture 23A of the light blocking plate 23 in correspondence with the arrangement of the G pixel on which the G ray to be blocked is incident. The ratio of covering the aperture 23A corresponds to the magnitude of the incident divergence angle to be limited. By providing the two filters 30B and 30G, only the incident divergence angles UB and UG on the R pixel side of the B and G rays can be efficiently limited. In the example of the diagram, each of the incident divergence angles (B and UG is limited to 2.25° in contrast to 2.5° of the incident divergence angle $\alpha_R$ of the R ray.

As described above, according to the light divergence angle limiting apparatus (light blocking plate 23 and filters 30, 30B and 30G) of the embodiment, the divergence angle of at least one of a plurality of color rays is limited in consideration of the light emission characteristics of the light source 11 so that the color rays (for example, B and G rays) different hi from a predetermined color ray (for example, R ray) do not enter the pixel corresponding to the predetermined color ray. Consequently, it can be prevented that unnecessary color rays other than the predetermined color ray enter the pixel corresponding to the predetermined color ray. According to the projection image display apparatus of the embodiment, since the light divergence angle limiting apparatus is used, by preventing unnecessary color rays except for a predetermined color ray from entering the pixel corresponding to the predetermined color ray, the color purity can be improved and a high quality image can be displayed.

The invention is not limited to the foregoing embodiment but can be variously modified. For example, although the case of using the transmission liquid crystal panel has been described in the embodiment, the invention can be also applied to a case where a reflection liquid crystal panel is used. The invention is not limited to a display apparatus using a liquid crystal panel but can be applied to display apparatuses in other modes.

As described above, according to the light divergence angle limiting apparatus or the light divergence angle limiting method of the invention, the divergence angle of at least one of the plurality of color rays is regulated so that color rays different from a predetermined color ray do not enter a pixel corresponding to the predetermined ray. Consequently, unnecessary color rays other than the predetermined color ray can be prevented from entering the pixel corresponding to the predetermined color ray.

According to the projection image display apparatus of the invention, the light including the plurality of color rays emitted from the light source comes in, and the divergence angle of at least one of the plurality of color rays is limited so that the color rays different from a predetermined color ray do not enter a pixel corresponding to the predetermined color ray. The color rays entering the plurality of pixels are selectively optically modulated in accordance with an image to be displayed. Thus, the color purity can be improved and a high-quality image can be displayed by preventing unnecessary color rays other than the predetermined color ray from entering the pixel corresponding to the predetermined color ray.

Particularly, according to the light divergence angle limiting apparatus or the projection image display apparatus of the invention, the light divergence angle of at least one of the color rays, which is on the side of the pixel corresponding to the predetermined color ray is limited. Consequently, the divergence angle of an unnecessary color ray can be efficiently limited.

Obviously many modifications and variations of the present invention are possible in the light of the above teachings. It is therefore to be understood that within the scope of the appended claims the invention may be practiced otherwise than as specifically described.

What is claimed is:

1. A projection image display apparatus having a plurality of pixels corresponding to a plurality of color rays, comprising:

a light source which emits light including a plurality of color rays;

light divergence angle limiting means to which light including a plurality of color rays emitted from the light source comes and which limits a divergence angle of at least one of the plurality of color rays so that light rays different from a predetermined light ray do not enter a pixel corresponding to the predetermined color ray;

an optical modulating device in which a plurality of pixels corresponding to the plurality of color rays are arranged and which selectively modulates color rays entering the plurality of pixels in accordance with an image to be displayed; and projecting means for projecting each of the color rays optically modulated by the optical modulating device, wherein the divergence angle limiting means comprises:

light blocking means which has an optically transparent aperture and blocks light incident on the light blocking means except for the aperture; and a filter which is partially provided at the aperture of the light blocking means and blocks only a predetermined color ray of which divergence angle is to be limited.

2. The projection image display apparatus according to claim 1, wherein the divergence angle limiting means limits a divergence angle of at least one color ray, the divergence angle being on the side of the pixel corresponding to the predetermined color ray.

3. The projection image display apparatus according to claim 1, wherein the predetermined color ray is a red (R) ray.

4. A light divergence angle limiting apparatus for limiting a divergence angle of light entering a plurality of pixels which are made to correspond to a plurality of color rays, comprising:

a light blocking plate including a filter, light being incident upon said light blocking plate at an incident angle, said plurality of color rays illuminating an optical modulating device at a plurality of divergence angles, a first color ray of said plurality of color rays having a first divergence angle of said plurality of divergence angles, a second color ray of said plurality of color rays having a second divergence angle of said plurality of divergence angles, said second divergence angle being different from said first divergence angle, said filter transmitting a first wavelength of said light while filtering a second wavelength of said light, said first wavelength corresponding to said first color ray and said second wavelength corresponding to said second color ray, said filter modifying said second divergence angle while said first divergence angle remains unmodified by said filter.

5. The light divergence angle limiting apparatus according to claim 4, wherein:

a third color ray of said plurality of color rays has a third divergence angle of said plurality of divergence angles, said third divergence angle being different from said second divergence angle and said first divergence angle, a third wavelength of said light corresponds to said third color ray.

6. The light divergence angle limiting apparatus according to claim 5, wherein:

said filter includes a second color filter and a third color filter, said second color filter modifying said second divergence angle while said first divergence angle remains unmodified by said second color, said third color filter modifying said third divergence angle while said first divergence angle remains unmodified by said third color filter.

7. The light divergence angle limiting apparatus according to claim 6, wherein, said first color ray is a red ray, said a second color ray is a green ray, and said third color ray is a blue ray.

8. The light divergence angle limiting apparatus according to claim 4, wherein a plurality of dichroic mirrors are disposed between said light blocking plate and said optical modulating device, said plurality of dichroic mirrors separating said light into said plurality of color rays.

9. The light divergence angle limiting apparatus according to claim 4, wherein said light blocking plate further includes a light blocking portion, said light blocking portion preventing a portion of said plurality of color rays from passing through said light blocking plate.

10. The light divergence angle limiting apparatus according to claim 4, wherein said light blocking plate further includes an aperture, said aperture being structurally adapted to permit said plurality of color rays to pass through said light blocking plate.

11. The light divergence angle limiting apparatus according to claim 10, wherein said aperture is optically transparent.

12. The light divergence angle limiting apparatus according to claim 10, wherein said aperture is an opening within said light blocking plate, said opening being structurally adapted to permit said plurality of color rays to pass through said light blocking plate.

13. The light divergence angle limiting apparatus according to claim 10, wherein said filter partially covers said aperture.

14. The light divergence angle limiting apparatus according to claim 4, wherein said optical modulating device is a liquid crystal panel, said liquid crystal panel including said plurality of pixels, said plurality of color rays illuminating said plurality of pixels.

15. The light divergence angle limiting apparatus according to claim 4, wherein said optical modulating device modulates said plurality of color rays.

16. The light divergence angle limiting apparatus according to claim 4, wherein said light blocking plate has an optically transparent aperture and blocks light incident on said light blocking plate except for said aperture, and said filter is partially provided at said aperture of said light blocking plate.

17. The light divergence angle limiting apparatus according to claim 4, wherein said filter is an absorption filter, said absorption filter absorbing said light in a specific wavelength range.

18. The light divergence angle limiting apparatus according to claim 4, wherein said filter is an interference filter, said interference filter transmitting or reflecting said light in a specific wavelength range.

19. The light divergence angle limiting apparatus according to claim 4, wherein said first color ray is a red ray.

20. The light divergence angle limiting apparatus according to claim 4, wherein said second color ray is a green ray.

21. The light divergence angle limiting apparatus according to claim 4, wherein said second color ray is a blue ray.

22. A light divergence angle limiting method of limiting a divergence angle of light entering a plurality of pixels which are made to correspond to a plurality of color rays, the method comprising the steps of:

illuminating a light blocking plate with light, said light illuminating said light blocking plate at an incident angle, said light blocking plate including a filter, transmitting a first wavelength of light while filtering a second wavelength of said light, said filter transmitting said first wavelength while filtering said second wavelength;

illuminating an optical modulating device at a plurality of divergence angles, said plurality of color rays illuminating said optical modulating device, a first color ray of said plurality of color rays having a first divergence angle of said plurality of divergence angles, a second color ray of said plurality of color rays having a second divergence angle of said plurality of divergence angles, said second divergence angle being different from said first divergence angle, said first wavelength corresponding to said first color ray and said second wavelength corresponding to said second color ray;

modifying said second divergence angle, said filter modifying said second divergence angle while said first divergence angle remains unmodified by said filter.

23. The light divergence angle limiting method according to claim 16, wherein:

a third color ray of said plurality of color rays has a third divergence angle of said plurality of divergence angles, said third divergence angle being different from said second divergence angle and said first divergence angle, a third wavelength of said light corresponds to said third color ray.

24. The light divergence angle limiting method according to claim 23, wherein:

said filter includes a second color filter and a third color filter, said second color filter modifying said second divergence angle while said first divergence angle remains unmodified by said second color, said method further comprising:

modifying said third divergence angle, said third color filter modifying said third divergence angle while said first divergence angle remains unmodified by said third color filter.

25. The light divergence angle limiting method according to claim 23, wherein, said first color ray is a red ray, said a second color ray is a green ray, and said third color ray is a blue ray.

26. The light divergence angle limiting method according to claim 22, wherein a plurality of dichroic mirrors are disposed between said light blocking plate and said optical modulating device, said plurality of dichroic mirrors separating said light into said plurality of color rays.

27. The light divergence angle limiting method according to claim 22, wherein said light blocking plate further includes a light blocking portion, said light blocking portion preventing a portion of said plurality of color rays from passing through said light blocking plate.

28. The light divergence angle limiting method according to claim 22, wherein said light blocking plate further includes an aperture, said aperture being structurally adapted to permit said plurality of color rays to pass through said light blocking plate.

29. The light divergence angle limiting method according to claim 28, wherein said aperture is optically transparent.

30. The light divergence angle limiting method according to claim 28, wherein said aperture is an opening within said light blocking plate, said opening being structurally adapted to permit said plurality of color rays to pass through said light blocking plate.

31. The light divergence angle limiting method according to claim 28, wherein said filter partially covers said aperture.

32. The light divergence angle limiting method according to claim 22, wherein said optical modulating device is a liquid crystal panel, said liquid crystal panel including said plurality of pixels, said plurality of color rays illuminating said plurality of pixels.

33. The light divergence angle limiting method according to claim 22, wherein said optical modulating device modulates said plurality of color rays.

34. The light divergence angle limiting method according to claim 22, wherein said light blocking plate has an optically transparent aperture and blocks light incident on said light blocking plate except for said aperture, and said filter is partially provided at said aperture of said light blocking plate.

35. The light divergence angle limiting method according to claim 22, wherein said filter is an absorption filter, said absorption filter absorbing said light in a specific wavelength range.

36. The light divergence angle limiting method according to claim 22, wherein said filter is an interference filter, said interference filter transmitting or reflecting said light in a specific wavelength range.

37. The light divergence angle limiting method according to claim 22, wherein said first color ray is a red ray.

38. The light divergence angle limiting method according to claim 22, wherein said second color ray is a green ray.

39. The light divergence angle limiting method according to claim 22, wherein said second color ray is a blue ray.

40. The light divergence angle limiting apparatus according to claim 4, wherein said light blocking plate is a divergence angle limiting means into which light including said plurality of color rays comes and which limits a divergence angle of at least one of the plurality of color rays so that color rays different from a predetermined color ray do not enter a pixel corresponding to the predetermined color ray.

41. The light divergence angle limiting apparatus according to claim 40, wherein the divergence angle limiting means limits the divergence angle of at least one of the color rays, the divergence angle being on the side of the pixel corresponding to the predetermined color ray.

42. The light divergence angle limiting apparatus according to claim 40, wherein the predetermined color ray is a red (R) ray.

43. The light divergence angle limiting method according to claim 22, wherein said step of illuminating an optical modulating device includes:

receiving light including a plurality of color rays and limiting the divergence angle of at least one of the plurality of color rays so that color rays different from a predetermined color ray do not enter the pixel corresponding to the predetermined color ray.

44. The light divergence angle limiting method according to claim 43, wherein the predetermined color ray is a red (R) ray.

* * * * *